(12) United States Patent
Alavi

(10) Patent No.: US 10,246,373 B2
(45) Date of Patent: Apr. 2, 2019

(54) CURABLE FIBERGLASS BINDER

(71) Applicant: JOHNS MANVILLE, Denver, CO (US)

(72) Inventor: Kiarash Alavi, Littleton, CO (US)

(73) Assignee: Johns Manville, Denver, CO (US)

( * ) Notice: Subject to any disclaimer, the term of this patent is extended or adjusted under 35 U.S.C. 154(b) by 52 days.

(21) Appl. No.: 15/152,329

(22) Filed: May 11, 2016

(65) Prior Publication Data

US 2016/0251787 A1   Sep. 1, 2016

Related U.S. Application Data

(62) Division of application No. 12/539,263, filed on Aug. 11, 2009, now Pat. No. 9,365,963.

(51) Int. Cl.
| | |
|---|---|
| *D04H 1/4218* | (2012.01) |
| *C03C 25/34* | (2006.01) |
| *D04H 1/64* | (2012.01) |
| *C03C 25/321* | (2018.01) |
| *C08K 5/07* | (2006.01) |
| *C08L 79/08* | (2006.01) |
| *C09J 179/08* | (2006.01) |
| *C08K 7/14* | (2006.01) |
| *D04H 1/587* | (2012.01) |
| *C03C 25/25* | (2018.01) |
| *C03C 25/1095* | (2018.01) |
| *C03C 25/42* | (2006.01) |
| *C03C 25/24* | (2018.01) |

(52) U.S. Cl.
CPC .......... *C03C 25/34* (2013.01); *C03C 25/1095* (2013.01); *C03C 25/24* (2013.01); *C03C 25/25* (2018.01); *C03C 25/321* (2013.01); *C03C 25/42* (2013.01); *C08K 5/07* (2013.01); *C08K 7/14* (2013.01); *C08L 79/085* (2013.01); *C09J 179/085* (2013.01); *D04H 1/4218* (2013.01); *D04H 1/587* (2013.01); *D04H 1/64* (2013.01); *C03C 2217/29* (2013.01); *Y10T 442/2992* (2015.04)

(58) Field of Classification Search
CPC ...... D04H 1/4218; D04H 1/641; D04H 1/587; D04H 1/64; C08K 5/07; C08K 7/14; C03C 25/34; C03C 25/24; C03C 25/25; C03C 25/42; C03C 25/1095; C03C 25/321; C03C 2217/29; C09J 179/085; C08L 79/085; Y10T 442/2992

See application file for complete search history.

(56) References Cited

U.S. PATENT DOCUMENTS

| | | | |
|---|---|---|---|
| 1,801,053 A | 4/1931 | Meigs | |
| 3,006,879 A | 10/1961 | Ryan et al. | |
| 3,383,267 A | 5/1968 | Sunden | |
| 3,513,001 A | 5/1970 | Worthington et al. | |
| 4,048,127 A | 9/1977 | Gibbons et al. | |
| 4,410,685 A | 10/1983 | Williams | |
| 5,321,120 A | 6/1994 | Sommerfeld | |
| 5,905,115 A | 5/1999 | Luitjes et al. | |
| 6,387,506 B1 * | 5/2002 | Kawamura | C08G 59/56 428/413 |
| 7,265,169 B2 | 9/2007 | Li et al. | |
| 7,655,711 B2 | 2/2010 | Swift et al. | |
| 8,372,900 B2 | 2/2013 | Shooshtari et al. | |
| 8,377,564 B2 | 2/2013 | Shooshtari et al. | |
| 8,651,285 B2 | 2/2014 | Shooshtari et al. | |
| 8,708,162 B2 | 4/2014 | Shooshtari et al. | |
| 2005/0221705 A1 | 10/2005 | Hitch | |
| 2007/0027283 A1 * | 2/2007 | Swift | C07H 5/04 527/312 |
| 2007/0082208 A1 * | 4/2007 | Shooshtari | C09D 4/00 428/474.4 |
| 2007/0123679 A1 | 5/2007 | Swift et al. | |
| 2007/0123680 A1 | 5/2007 | Swift et al. | |
| 2008/0160854 A1 | 7/2008 | Nandi et al. | |
| 2011/0039111 A1 | 2/2011 | Shooshtari | |
| 2011/0040010 A1 | 2/2011 | Shooshtari | |
| 2011/0042302 A1 | 2/2011 | Shooshtari et al. | |
| 2011/0042303 A1 | 2/2011 | Shooshtari et al. | |

(Continued)

FOREIGN PATENT DOCUMENTS

| | | |
|---|---|---|
| DE | 1905054 A1 | 8/1969 |
| DE | 43 08 089 A1 | 9/1994 |

(Continued)

OTHER PUBLICATIONS

Opposition filed Sep. 26, 2014 by Knauf Insulation to European Patent No. EP2464771 granted Dec. 25, 2013, 21 pages.
Opposition filed Sep. 26, 2014 by Knauf Insulation to European Patent No. EP2467519 granted Dec. 25, 2013, 10 pages.
Opposition filed Sep. 26, 2014 by Knauf Insulation to European Patent No. EP2464772 granted Dec. 25, 2013, 13 pages.
Opposition filed Jul. 17, 2015 by Knauf Insulation to European Patent No. EP2467520 granted Oct. 8, 2014, 6 pages.

(Continued)

*Primary Examiner* — Elizabeth M Cole
(74) *Attorney, Agent, or Firm* — Robert D. Touslee

(57) ABSTRACT

A curable formaldehyde-free binding composition for use with fiberglass is provided. Such curable composition comprises an addition product of an amine and a reactant to form an amino-amide intermediate. To the amino-amide is added an aldehyde or ketone to form the curable binder composition. The composition when applied to fiberglass is cured to form a water-insoluble binder which exhibits good adhesion to glass. In a preferred embodiment the fiberglass is in the form of building insulation. In other embodiments the product is a microglass-based substrate for use in a printed circuit board, battery separator, filter stock, or reinforcement scrim.

20 Claims, No Drawings

(56) References Cited

U.S. PATENT DOCUMENTS

2011/0045966 A1    2/2011   Shooshtari et al.
2011/0046271 A1    2/2011   Shooshtari et al.

FOREIGN PATENT DOCUMENTS

| | | |
|---|---:|---|
| DE | 102004033561 A1 | 9/2005 |
| EP | 1510607 A1 | 3/2005 |
| EP | 1652868 A1 | 5/2006 |
| EP | 2223941 A1 | 9/2010 |
| EP | 2386605 A1 | 11/2011 |
| EP | 2464771 B1 | 12/2013 |
| EP | 2464772 B1 | 12/2013 |
| EP | 2467519 B1 | 12/2013 |
| GB | 2451719 A | 2/2009 |
| WO | 2000/017120 | 3/2000 |
| WO | 2003022899 A1 | 3/2003 |
| WO | 2004007615 A1 | 1/2004 |
| WO | 2007014236 A2 | 2/2007 |
| WO | 2009149334 A2 | 12/2009 |
| WO | 2010 106181 A1 | 9/2010 |
| WO | 2010 108999 A1 | 9/2010 |
| WO | 2010 142568 A1 | 12/2010 |
| WO | 2011 019590 A1 | 2/2011 |
| WO | 2011 019597 A1 | 2/2011 |
| WO | 2011 022227 A1 | 2/2011 |

\* cited by examiner

CURABLE FIBERGLASS BINDER

CROSS-REFERENCE TO RELATED APPLICATION

This application is a division of prior pending U.S. application Ser. No. 12/539,263 filed Aug. 11, 2009. The entire contents of the above-identified application is herein incorporated by reference for all purposes.

BACKGROUND

The subject invention pertains to an improved binding composition for use with fiberglass. More specifically, the invention pertains to an improved curable composition comprising an addition product of an amine and a reactant in the form of a amino-amide intermediate. An aldehyde or ketone is added to the amino-amide to form a composition which upon curing is capable of forming a water-insoluble polymer composition which displays good adhesion to glass. Once applied to the fiberglass, the binding composition is cured. The binder of the present invention is useful as a fully acceptable replacement for formaldehyde-based binders in non-woven fiberglass products, and actually provides a binder exhibiting improved physical properties.

Fiberglass binders have a variety of uses ranging from stiffening applications where the binder is applied to woven or non-woven fiberglass sheet goods and cured, producing a stiffer product; thermo-forming applications wherein the binder resin is applied to a sheet or lofty fibrous product, following which it is dried and optionally B-staged to form an intermediate but yet curable product; and to fully cured systems such as building insulation.

Fibrous glass insulation products generally comprise matted glass fibers bonded together by a cured thermoset polymeric material. Molten streams of glass are drawn into fibers of random lengths and blown into a forming chamber where they are randomly deposited as a mat onto a traveling conveyor. The fibers, while in transit in the forming chamber and while still hot from the drawing operation, are sprayed with an aqueous binder. A phenol-formaldehyde binder has been used throughout the fibrous glass insulation industry. The residual heat from the glass fibers and the flow of air through the fibrous mat during the forming operation are generally sufficient to volatilize water from the binder, thereby leaving the remaining components of the binder on the fibers as a viscous or semi-viscous high solid liquid. The coated fibrous mat is transferred to a curing oven where heated air, for example, is blown through the mat to cure the binder and rigidly bond the glass fibers together.

Fiberglass binders used in the present sense should not be confused with matrix resins which are an entirely different and non-analogous field of art. While sometimes termed "binders", matrix resins act to fill the entire interstitial space between fibers, resulting in a dense, fiber reinforced product where the matrix must translate the fiber strength properties to the composite, whereas "binder resins" as used herein are not space-filling, but rather coat only the fibers, and particularly the junctions of fibers. Fiberglass binders also cannot be equated with paper or wood product "binders" where the adhesive properties are tailored to the chemical nature of the cellulosic substrates. Many such resins are not suitable for use as fiberglass binders. One skilled in the art of fiberglass binders would not look to cellulosic binders to solve any of the known problems associated with fiberglass binders.

Binders useful in fiberglass insulation products generally require a low viscosity in the uncured state, yet possess characteristics so as to form a rigid thermoset polymeric binder for the glass fibers when cured. A low binder viscosity in the uncured state is required to allow the mat to be sized correctly. Also, viscous binders commonly tend to be tacky or sticky and hence they lead to the accumulation of fiber on the forming chamber walls. This accumulated fiber may later fall onto the mat causing dense areas and product problems. A binder which forms a rigid matrix when cured is required so that a finished fiberglass thermal insulation product, when compressed for packaging and shipping, will recover to its as-made vertical dimension when installed in a building.

From among the many thermosetting polymers, numerous candidates for suitable thermosetting fiberglass binder resins exist. However, binder-coated fiberglass products are often of the commodity type, and thus cost becomes a driving factor, generally ruling out resins such as thermosetting polyurethanes, epoxies, and others. Due to their excellent cost/performance ratio, the resins of choice in the past have been phenol-formaldehyde resins. Phenol-formaldehyde resins can be economically produced, and can be extended with urea prior to use as a binder in many applications. Such urea-extended phenol-formaldehyde binders have been the mainstay of the fiberglass insulation industry for years, for example.

Over the past several decades however, minimization of volatile organic compound emissions (VOCs) and hazardous air pollutants (HAPS) both on the part of the industry desiring to provide a cleaner environment, as well as by Federal regulation, has led to extensive investigations into not only reducing emissions from the current formaldehyde-based binders, but also into candidate replacement binders. For example, subtle changes in the ratios of phenol to formaldehyde in the preparation of the basic phenol-formaldehyde resole resins, changes in catalysts, and addition of different and multiple formaldehyde scavengers, has resulted in considerable improvement in emissions from phenol-formaldehyde binders as compared with the binders previously used. However, with increasingly stringent Federal regulations, more and more attention has been paid to alternative binder systems which are free from formaldehyde.

One such candidate binder system employs polymers of acrylic acid as a first component, and a polyol such as triethanolamine, glycerine, or a modestly oxyalkylated glycerin as a curing or "crosslinking" component. The preparation and properties of such poly(acrylic acid)-based binders, including information relative to the VOC emissions, and a comparison of binder properties versus urea-formaldehyde binders is presented in "Formaldehyde-Free Crosslinking Binders For Non-Wovens," Charles T. Arkins et al., TAPPI Journal, Vol. 78, No. 11, pages 161-168, November 1995. The binders disclosed by the Arkins article, appear to be B-stageable as well as being able to provide physical properties similar to those of urea/formaldehyde resins.

U.S. Pat. No. 5,340,868 discloses fiberglass insulation products cured with a combination of a polycarboxy polymer, a-hydroxyalkylamide, and at least one trifunctional monomeric carboxylic acid such as citric acid. The specific polycarboxy polymers disclosed are poly(acrylic acid) polymers. See also, U.S. Pat. No. 5,143,582.

U.S. Pat. No. 5,318,990 discloses a fibrous glass binder which comprises a polycarboxy polymer, a monomeric trihydric alcohol and a catalyst comprising an alkali metal salt of a phosphorous-containing organic acid.

U.S. 2007/0142596 discloses binders comprised of a mixture of Maillard reactants. The reactants comprise a monosaccharide and an ammonium salt of a polycarboxylic acid.

Published European Patent Application EP 0 583 086 A1 appears to provide details of polyacrylic acid binders whose cure is catalyzed by a phosphorus-containing catalyst system as discussed in the Arkins article previously cited. Higher molecular weight poly(acrylic acids) are stated to provide polymers exhibiting more complete cure. See also U.S. Pat. Nos. 5,661,213; 5,427,587; 6,136,916; and 6,221,973.

Some polycarboxylic polymers have been found useful for making fiberglass insulation products. Problems of clumping or sticking of the glass fibers to the inside of the forming chambers during the processing, as well as providing a final product that exhibits the recovery and rigidity necessary to provide a commercially acceptable fiberglass insulation product, have been overcome. See, for example, U.S. Pat. No. 6,331,350. The thermosetting acrylic resins have been found to be more hydrophilic than the traditional phenolic binders, however. This hydrophilicity can result in fiberglass insulation that is more prone to absorb liquid water, thereby possibly compromising the integrity of the product. Also, the thermosetting acrylic resins now being used as binding agents for fiberglass have been found to not react as effectively with silane coupling agents of the type traditionally used by the industry increasing product cost. The addition of silicone as a hydrophobing agent results in problems when abatement devices are used that are based on incineration as well as additional cost. Also, the presence of silicone in the manufacturing process can interfere with the adhesion of certain facing substrates to the finished fiberglass material. Overcoming these problems will help to better utilize polycarboxylic polymers in fiberglass binders.

Accordingly, in one aspect the present invention provides a novel, non-phenol-formaldehyde binder.

Another aspect of the invention provides a novel fiberglass binder which provides advantageous flow properties, the possibility of lower binder usage, the possibility of overall lower energy consumption, elimination of interference in the process by a silicone, and improved overall economics.

Still another aspect of the present invention is to provide a binder for fiberglass having improved economics, while also enjoying improved physical properties. In addition, the present invention increases the sustainable portion of the binder and reduces the dependency on a fossil based source for the resin.

These and other aspects of the present invention will become apparent to the skilled artisan upon a review of the following description and the claims appended hereto.

SUMMARY OF THE INVENTION

A curable composition for use in the binding of fiberglass is provided comprising an addition product of an amine and a saturated or unsaturated reactant in the form of an amino-amide intermediate. To this intermediate is added an aldehyde or ketone, preferably a reducing sugar, to form a curable binder composition. This composition upon curing is capable of forming a water-insoluble polymer composition which exhibits good adhesion to glass.

A process for binding fiberglass is provided comprising applying to fiberglass a coating of a composition comprising an addition product of an amine and a saturated or unsaturated reactant in the form of an amino-amide intermediate, to which is added an aldehyde or ketone. Thereafter the composition is cured while present as a coating on the fiberglass to form a water-insoluble polymer composition which exhibits good adhesion to the fiberglass.

In one embodiment, the amino-amide intermediate is first heated to create an oligomer. The aldehyde or ketone is added to the oligomer. This composition is added to the fiberglass as a binder and cured.

In a preferred embodiment the resulting fiberglass product is building insulation. A roofing membrane is also a useful application. In other embodiments the fiberglass product is a microglass-based substrate useful when forming a printed circuit board, battery separator, filter stock, or reinforcement scrim.

DETAILED DESCRIPTION OF PREFERRED EMBODIMENTS

The novel fiberglass binder composition of the present invention is a curable composition comprising the reaction product of an amine and a saturated or unsaturated reactant to form an amino-amide intermediate.

In accordance with one embodiment of the invention, amine reactants are selected which are capable of undergoing conjugate addition to form the requisite amino-amide, which forms a water-insoluble polyimide upon curing. In such an embodiment the amine is a di- or multi-functional primary or secondary amine. More preferably, the amine is a diamine having at least one primary amine group.

Example of amines include, but are not limited to, aliphatic, cycloaliphatic and aromatic amines. The amines may be linear or branched. The amine functionalities may be di- or multifunctional primary or secondary amines. The amines can include other functionalities and linkages such as alcohols, thiols, esters, amides, acids, ethers and others.

Representative amines that are suitable for use in such an embodiment include 1,2-diethylamine, 1,3-propanediamine, 1,4-butanediamine, 1,5-pentanediamine, 1,6-hexanediamine, .alpha.,.alpha.'-diaminoxylene, diethylenetriamine, triethylenetetramine, tetraethylenepentamine, and mixtures of these. A preferred diamines for use in this embodiment of the invention are 1,4-butanediamine and 1,6-hexanediamine. Natural and synthetic amino acids such as lysine, anginine, hestidine, etc. can also be used.

The curable amino-amide is formed through the selection of an unsaturated or saturated reactant that is an anhydride, carboxylic acid, ester, and salts and mixtures of such reactants. Representative unsaturated reactants are maleic acid, fumaric acid, maleic anhydride, mono- and di-esters of maleic acid and fumaric acid, and salts and mixtures of these. Ammonium salts of the unsaturated acids of their monoesters conveniently can be utilized. A preferred unsaturated reactant is maleic anhydride. Representative saturated reactants include, but are not limited to, succinic anhydride, succinic acid, mono and diesters of succinic acid, glutaric acid and anhydride, phthalic acid and anhydride, tetrahydro phthalic acid and anhydride, mono and diesters of acid anhydrides and salts of the acids, and their mono esters. A preferred saturated reactant is phthalic anhydride or tetrahydro phthalic anhydride.

The amino-amide addition products can be readily formed by mixing the components in an aqueous medium at room temperature. The resulting addition products are either water-soluble, water-dispersible, or are present as an emulsion. To the solution of amino-amide, the carbonyl functional materials can be added, especially an aldehyde or ketone. Due to their higher reactivity, aldehydes are preferred to ketones. The composition comprises the amino-amide and the aldehyde and/or ketone. Some reaction does take place within the composition between the components. However, the reaction is completed during the curing step, followed by the cross-linking reaction of curing.

Examples of suitable aldehydes include, but are not limited to, mono- and multifunctional aldehydes including acetaldehyde, hydroxy acetaldehyde, butyraldehyde, acrolein, furfural, glyoxal, glyceraldehyde, glutaraldehyde, polyfurfural, polyacrolein, copolymers of acrolein and others. Reducing mono, di- and polysaccharides such as glucose, maltose, etc. can be used, with reducing monosaccharides such as glucose being preferred.

Examples of ketones include, but are not limited to, acetone, acetyl acetone, 1,3-dihydroxy acetone, benzyl, benzoin, fructose, etc.

The aldehydes and ketones react with the amino-amide intermediate, which contains an amic acid function, i.e., an amide linkage in the vicinity of a carboxylic acid. An amic acid function is more reactive than a simple carboxylic acid. The amount of aldehyde and/or ketone added is generally such that the molar ratio of carboxylic acid in the amino-amide to carbonyl or ketone is from 1:5 to 50:1. A ratio of 1:20 to 20:1 is more preferred, with a ratio of 1:10 to 10:1 being most preferred.

One advantage is that the presence of all functional groups, i.e., amine, amide and carboxylic acid, on the same molecule eliminates the potential need for the addition of external crosslinkers or binders such as polycarboxylic acids and/or polyvinyl alcohol. Such crosslinkers can be added, however if desired.

In an embodiment, the amino-amide can be first oligomerized prior to adding the aldehyde or ketone. The amino-amide can be heated until an oligomer is obtained, e.g., a dimer, trimer or tetramer of the amino-amide intermediate. An example of suitable conditions for making the oligomer involves heating in the range of from 120-150° C. for up to 5 hours.

Using the oligomerized product has been found to result in a more robust binder product upon curing. This manifests itself in the strength of the binder, and allows for better storage results, higher tensile strength and rigidity, and better recovery for products made with the binder.

The composition when applied to the fiberglass optionally can include adhesion prompters, oxygen scavengers, solvents, emulsifiers, pigments, fillers, anti-migration aids, coalescent aids, wetting agents, biocides, plasticizers, organosilanes, anti-foaming agents, colorants, waxes, suspending agents, anti-oxidants, crosslinking catalysts, secondary crosslinkers, and combinations of these.

The fiberglass to which the composition according to the present invention is applied may take a variety of forms and in a preferred embodiment is building insulation. Roofing membranes is also a useful application due to good characteristics. In other embodiments the fiberglass is a microglass-based substrate useful in applications such as printed circuit boards, battery separators, filter stock, and reinforcement scrim.

The composition of the present invention can be applied to the fiberglass by a variety of techniques. In preferred embodiments these include spraying, spin-curtain coating, and dipping-roll coating. The composition can be applied to freshly-formed fiberglass, or to the fiberglass following collection. Water or other solvents can be removed by heating.

Thereafter the composition undergoes curing wherein a polymeric coating is formed which exhibits good adhesion to glass. The polymeric composition obtained upon curing is a combination of a polyamino-amide and a polyamino-imide. The polyimide is the primary product, but some of the amide in the intermediate is believed to not form the imide. Thus, some polyamino-amide is also present in the cured composition/binder.

Such curing can be conducted by heating. Elevated curing temperatures on the order of 100 to 300° C. generally are acceptable. Satisfactory curing results are achieved by heating in an air oven at 200° C. for approximately 20 minutes.

The cured binder at the conclusion of the curing step commonly is present as a secure coating on the fiberglass in a concentration of approximately 0.5 to 50 percent by weight of the fiberglass, and most preferably in a concentration of approximately 1 to 10 percent by weight of the fiberglass.

The present invention provides a formaldehyde-free route to form a securely bound formaldehyde-free fiberglass product. The binder composition of the present invention provides advantageous flow properties, the elimination of required pH modifiers such as sulfuric acid and caustic, and improved overall economics and safety. The binder also has the advantages of being stronger and offering lower amounts of relative volatile organic content during curing, which ensures a safer work place and environment. The cure time of the binder is also seen to be much faster and therefore does favor the economics, while reducing the energy consumption during the curing process and lowering the carbon footprint. The binder also contains a high level of sustainable raw materials further reducing the dependency on fossil based sources for the resin. Also, due to the hydrophobic nature of the binder, the need for a water repellant such as silicones is eliminated or greatly reduced.

The following examples are presented to provide specific examples of the present invention. In each instance the thin glass plate substrate that receives the coating can be replaced by fiberglass. It should be understood, however, that the invention is not limited to the specific details set forth in the Examples.

Preparation of Intermediates—

To 116 g 1, 6 diaminohexane (HMDA) dissolved in 214 g water, 98 g maleic anhydride (MAn) was added slowly (molar ratio of 1:1) and the solution was stirred for 10 min. The intermediate was labeled HM.

To 116 g HMDA dissolved in 264 g water was added to 148 g phthalic anhydride. After the anhydride dissolved, the intermediate was labeled HP.

To 116 g HMDA dissolved in 268 g water was added 152 g tetrahydro phthalic anhydride. The solution was stirred until all anhydride dissolved. The intermediate was labeled HT.

These intermediates were utilized to make the following resins with glucose.

Example 1

To 42.8 g of solution of the HM intermediate anhydrous dextrose (alpha-D-glucose) and water were added. The mass of added water was chosen to be equal to that of the corresponding dextrose. The mass of dextrose (and corresponding water) was 18 g, 36 g, 54 g, 72 g 90 g, 108, 144, 180 g and 216 g. The various solutions were stirred at ambient temperature for 10 mn. The solutions were applied as a thin film on glass and Al panel, dried in an oven at 100° C. for 5 min and cured at 200° C. for 20 min. Each of the solutions formed a cured brown polymer which was hard and insoluble in water and solvents, and showed an excellent adhesion to glass.

Example 2

To 52.8 g of solution of the HP intermediate, anhydrous dextrose (alpha-D-glucose) and water were added. The mass of added water was chosen to be equal to that of the corresponding dextrose. The mass of dextrose (and corresponding water) was 18 g, 36 g, 54 g, 72 g, 90 g, 108, 144, 180 g and 216 g. The various solutions were stirred at ambient temperature for 10 min. The solutions were applied as a thin film on a glass and A1 panel, dried in an oven at 100° C. for 5 min and cured at 200° C. for 20 min. Each solution formed a cured brown polymer which was hard and insoluble in water and solvents, and showed an excellent adhesion to glass.

Example 3

To 53.6 g of solution of the HT intermediate, anhydrous dextrose (alpha-D-glucose) and water were added. The mass of added water was chosen to be equal to that of corresponding dextrose. The mass of dextrose (and corresponding water) was 18 g, 36 g, 54 g, 72 g, 90 g, 108, 144, 180 g and 216 g. The various solutions were stirred at ambient temperature for 10 min. The solutions were applied as a thin film on glass and A1 panel, dried in an oven at 100° C. for 5 min and cured at 200° C. for 20 min. Each solution formed a cured brown polymer which was hard and insoluble in water and solvents, and showed an excellent adhesion to glass.

Example 4

Examples 1-3 were repeated in the presence of 5% by weight ammonium sulfate. The polymers became insoluble in water in less than 10 min.

Example 5

To 116 g HMDA dissolved in 214 g water was added slowly 98 g maleic anhydride (Man), this was a molar ratio of 1:1. The resulting solution was refluxed for 60 minutes to prepare an amino-amide oligomer. The solution was opaque with 50% solids. The solution was then used to repeat example 1 with the observed results being the same, i.e., the cured polymer was hard and insoluble in water and solvents, and showed excellent adhesion to glass.

Example 6—Plant Trial

To examine the performance of the binder on an insulation batt, a binder solution was prepared and applied in the manufacture of the insulation batt. Processing and performance of the batts made with the binder of this invention was compared with the batts manufactured with a polyacrylic acid binder cured with triethanol amine.

To prepare the binder, 116 g HMDA was dissolved in 754 kg water. To this solution was added 98 kg maleic anhydride with stirring until dissolved. To this solution was added 540 kg anhydrous dextrose. When the dextrose dissolved, 37.7 kg ammonium sulfate was added. After all the ingredients dissolved, the clear binder solution was utilized in the manufacture of R-19 and R-13 insulation batt.

The binder was applied at the rate of 4.5% binder on glass fiber containing 1% (based on binder) of an amino-propyl silane coupling agent and about 0.5% dedusting oil. The batt was cured at 210° C. with an oven residence time of two minutes. The 32" droop (sag) and recovery data for R-19 insulation batt products are presented in Table 1 and Table 2 below respectively:

TABLE 1

32" Droop Data for R-19

|  | Unaged | 7 Day | 14 Day |
| --- | --- | --- | --- |
| Control (Acrylic) | 1.1 | 1.7 | 2.2 |
| HP | 1.0 | 1.3 | 1.6 |

TABLE 2

Recovery fir R-19

|  | Unaged | 7 Day | 14 Day |
| --- | --- | --- | --- |
| Control (Acrylic) | 6.91 | 6.48 | 6.38 |
| HP | 6.85 | 6.55 | 6.41 |

As seen from Table 1 and Table 2, the R-19 insulation product of the new formaldehyde free binder of this invention (HP) has better performance compared to the commercial acrylic control.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process of making a formaldehyde-free fiberglass product, wherein the process comprises:
    applying a binder composition to glass fibers, wherein the binder composition comprises:
    an aldehyde or ketone, and
    an amino-amide oligomer consisting of an addition product of an amine and a carbonyl-containing compound; and
    curing the binder composition while present on the glass fibers to make the formaldehyde-free fiberglass product, wherein the cured binder composition includes reaction products of the aldehyde or ketone and the amino-amide oligomer.

2. The process of claim 1, wherein the aldehyde or ketone comprises a reducing sugar.

3. The process of claim 2, wherein the reducing sugar comprises dextrose.

4. The process of claim 1, wherein the amine is a diamine having at least one primary amine group.

5. The process of claim 1, wherein the amine comprises at least one amine selected from the group consisting of 1,2-diethylamine, 1,3-propanediamine, 1,4-butanediamine, 1,5-pentanediamine, 1,6-hexanediamine, α, α'-diaminoxylene, diethylenetriamine, triethylenetetramine, and tetraethylenepentamine.

6. The process of claim 1, wherein the carbonyl-containing compound is selected from the group consisting of a saturated or unsaturated anhydride, a carboxylic acid, an ester, and salts and mixtures thereof.

7. The process of claim 1, wherein the carbonyl-containing compound is selected from the group consisting of maleic acid, fumaric acid, maleic anhydride, mono- and di-esters of maleic acid, mono- and di-esters of fumaric acid, and phthalic anhydride, tetrahydro phthalic anhydride, succinic acid and anhydride, glutaric acid and anhydride, salts and mixtures thereof.

8. The process of claim 1, wherein the carbonyl-containing compound is maleic anhydride.

9. The process of claim 1, wherein the binder composition further comprises at least one component selected from the group consisting of adhesion promoters, oxygen scavengers, moisture repellants, solvents, emulsifiers, pigments, fillers, anti-migration aids, coalescent aids, wetting agents, biocides, plasticizers, organosilanes, anti-foaming agents, colorants, waxes, suspending agents, anti-oxidants, and cross-linking catalysts.

10. The process of claim 1, wherein the formaldehyde-free fiberglass product is building insulation.

11. The process of claim 1, wherein the formaldehyde-free fiberglass product is a microglass-based substrate useful for any of a printed circuit board, battery separator, filter stock, or reinforcement scrim.

12. The process of claim 1, wherein the formaldehyde-free fiberglass product is a fiberglass substrate useful in a roofing membrane.

13. A process of making a formaldehyde-free fiberglass product, wherein the process comprises:
reacting an amine and a carbonyl-containing compound to form an amino-amide oligomer,
mixing the amino-amide oligomer with a reducing sugar to form a binder composition;
applying the binder composition to glass fibers; and
curing the binder composition while present on the glass fibers to make the formaldehyde-free fiberglass product, wherein the cured binder composition includes reaction products of the reducing sugar and the amino-amide oligomer.

14. The process of claim 13, wherein the amino-amide compound is in an aqueous medium.

15. The process of claim 13, wherein the amine and the carbonyl-containing compound are reacted at a temperature range of 120° C. to 150° C.

16. The process of claim 13, wherein the curing of the binder composition occurs at a temperature of 100° C. to 300° C.

17. The process of claim 13, wherein the binder composition is an aqueous solution.

18. The process of claim 13, wherein the amine comprises at least one amine selected from the group consisting of 1,2-diethylamine, 1,3-propanediamine, 1,4-butanediamine, 1,5-pentanediamine, 1,6-hexanediamine, α, α'-diaminoxylene, diethylenetriamine, triethylenetetramine, and tetraethylenepentamine.

19. The process of claim 13, wherein the carbonyl-containing compound comprises at least one compound selected from maleic acid, fumaric acid, maleic anhydride, mono- and di-esters of maleic acid, mono- and di-esters of fumaric acid, and phthalic anhydride, tetrahydro phthalic anhydride, succinic acid and anhydride, glutaric acid and anhydride, salts and mixtures thereof.

20. The process of claim 1, wherein the cured binder composition further comprises a polyamino-amide and a polyamino-imide.

* * * * *